United States Patent [19]

Ou

[11] Patent Number: 4,533,224
[45] Date of Patent: Aug. 6, 1985

[54] MULTI-IMAGE CAMERA

[76] Inventor: Jan-Chou Ou, No. 7-2, Lane 60, Ning An St., Taipei, Taiwan

[21] Appl. No.: 448,494

[22] Filed: Dec. 10, 1982

[51] Int. Cl.³ .............................................. G03B 29/00
[52] U.S. Cl. ...................................................... 354/77
[58] Field of Search ................. 354/77, 109, 125, 295, 354/296; 352/46, 47, 89

[56] References Cited

U.S. PATENT DOCUMENTS 2,821,105  1/1958  Walker ............................. 354/77 X
4,183,644  1/1980  Tureck et al. ........................ 354/77

Primary Examiner—John Gonzales
Attorney, Agent, or Firm—Balogh, Osann, Kramer, Dvorak, Genova & Traub

[57] ABSTRACT

A camera can create a combined image on the film with two different light sources, and it comprises a slide projecting device mounted between the camera lens and the camera body. Upon inserting a mask and a slide transparency into the slide projecting device, the subject image on the slide will be projected and merged with external image coming through the camera lens to form a combined image on the film without using darkroom montage technique or photo studio facilities; it is particularly useful and convenient for a sight-seeing traveller to put his (or her) own portrait against a landscape or architecture background without bothering other people to take a picture for him (or her) or using a tripod.

3 Claims, 18 Drawing Figures

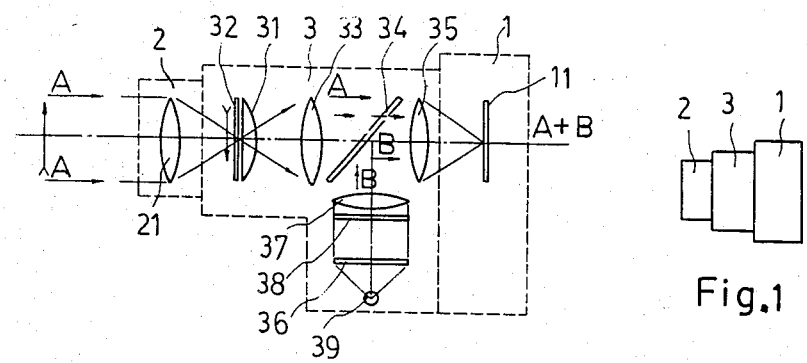
Fig.1
Fig.2
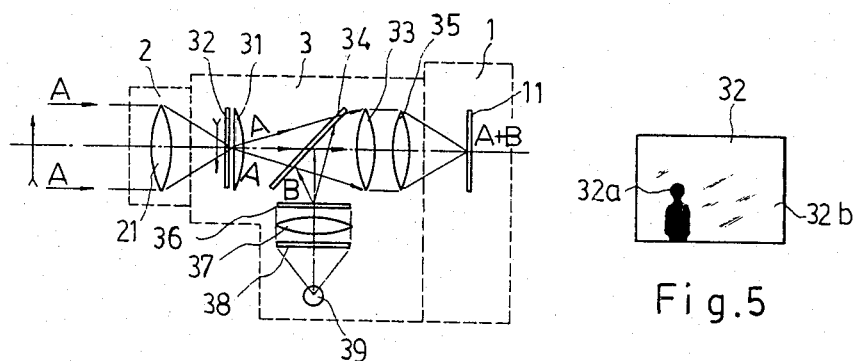
Fig.3
Fig.5
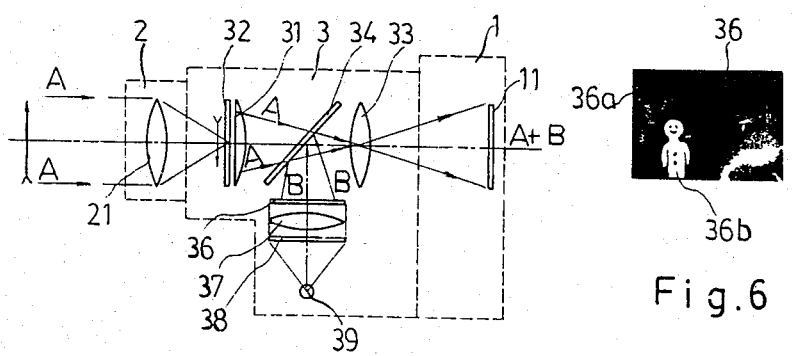
Fig.4
Fig.6

MULTI-IMAGE CAMERA

BACKGROUND OF THE INVENTION

Using a camera to take photographs is a popular and widely shared activity, particularly during travelling and sightseeing; however, there are some problems to be overcome. First, a person who holds a camera cannot take his own picture. If he wants his picture to be taken before a landscape or other background, he has to ask another person to trigger the camera for him, or to use a tripod and an automatic shutter and timer. When travelling alone, a person cannot take his own picture in the first situation. In the second situation, it is still difficult to make sharp focus or good perspective by using a tripod to take one's own picture, if no other reference object is nearby. There is another problem when taking a portrait against a landscape background; it is difficult to strike a proper balance between the portrait and the landscape images in terms of size and focus.

To take a clear and big enough portrait, the depth of field has to be short, but the background image will be out of focus and become blurred. A long focus lens may be used for improving the aforesaid problem in the background image, but the background will be confined to a narrow scope. On the other hand, a wide scope and clear background picture may be obtained by using a longer depth of field; then, the portrait in the whole picture will become small because the person has to stand far away from the camera in order to get a sharp focus.

Currently, there are some image combining techniques and equipment available. One of them is to project a slide on a screen as a background picture and to have the person positioned in front of the screen; then, let the images of the background and the person pass through the camera lens and focus on the film to produce a combined image. This has to be done in a photo studio furnished with screen and other bulky equipments.

Another of said techniques is to use the darkroom technique to create the montage effect for the images to be combined. However, all of the aforesaid techniques are inconvenient or not practical to an amateur phototaking, particularly during travelling time.

BRIEF SUMMARY OF THE INVENTION

It is a camera with a slide projecting device to be installed between the camera body and camera lens. Upon triggering the shutter of camera, a landscape image which passes through the camera lens and the subject image of a slide transparency inserted into the slide projecting device will be superimposed together to form a combined image picture on the film. The slide projecting device is a detachable unit from and between the camera body and the lens; in other words, once the slide projecting device is removed, the camera body and the lens can be assembled together as a usual camera. The slide projecting device comprises a field lens positioned on the focal plane of camera lens, a mask positioned in front of the field lens, a transferring lens to convert the outside scenery light rays from the field lens into parallel rays, a partial reflecting mirror to pass the light rays from the transferring lens to the rear, a slide projecting lens installed on the other side of the partial reflecting mirror and being used for projecting the slide image on the backside of the partial reflecting mirror for reflecting, a slide installed in front of the slide projecting lens, a color temperature conversion filter installed in front of said projecting lens, a lamp to illuminate the slide, and a convergent lens installed behind the partial reflecting mirror for superimposing the external image rays entering through the camera lens, the mask, the field lens, the transferring lens, the partial reflecting mirror and the slide image rays coming through the slide projecting lens, the partial reflecting mirror so as to form a combined image on the film which is also on the focal plane of said convergent lens.

This invention relates to a multi-image camera, partially a camera with a slide projecting device installed between the camera body and the lens set. Upon triggering the shutter, an external image through the camera lens and the image of a slide inserted into the slide projecting device and through its lens set will be superimposed together to form a multi-image picture on the film.

The main object of the present invention is to produce a combined image on camera film. With a ready slide and mask, a person can take his own picture against the real landscape without standing before the camera personally, and also does not need to bother or ask other people for help, and does not need the studio or dark room facilities to produce the same results, also does not need tripod and automatic shutter and timer features to achieve the same effect.

Another object of the present invention is to provide a multi-image camera, which is furnished with a slide projecting device, in a detachable manner, installing between the camera body and the camera lens. Upon the slide projecting device being detached from the camera body and the lens being assembled back to camera body, the said camera will become a usual and conventional camera.

A further object of the present invention is to provide a multi-image camera, with which a clear and sharp-focused portrait picture from slide can be superimposed with a clear and sharp-focused scenery background picture at the same time, to form a combined picture on the film, whether the depth of field of the scenery background is long or not.

BRIEF DESCRIPTION OF THE DRAWINGS

FIG. 1 is the basic structure of camera in the present invention.

FIG. 2 is the structure of the first preferred embodiment of the present invention, showing the principal configuration of the lens set and the optical relationship therein.

FIG. 3 is the second preferred embodiment of the present invention, showing the principal configuration of the lens set and the optical relationship therein.

FIG. 4 is the third preferred embodiment of the present invention, showing the principal configuration of the lens set and the optical relationship therein.

FIG. 5 is a front view of an embodiment of the mask in the present invention.

FIG. 6 is a front view of an embodiment of a slide in the present invention.

DETAILED DESCRIPTION

Figure 7:
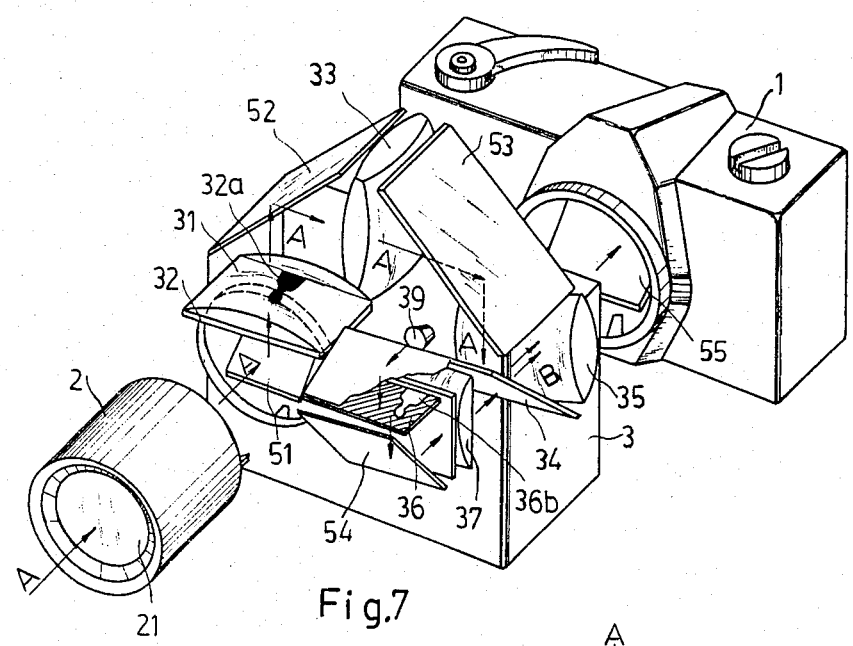
FIG. 7 is a perspective view of the first preferred embodiment of camera in the present invention.
Figure 8:
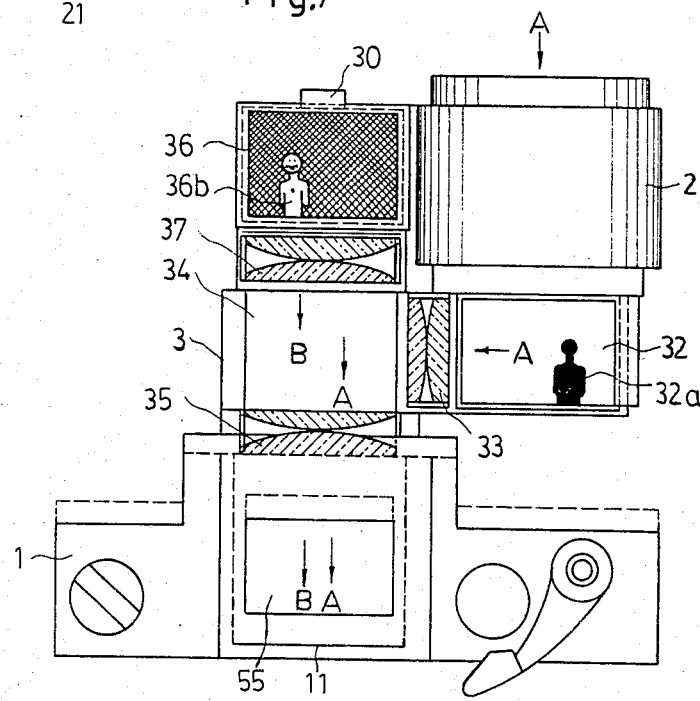
FIG. 8 is the plan view of the first preferred embodiment.
Figure 9:
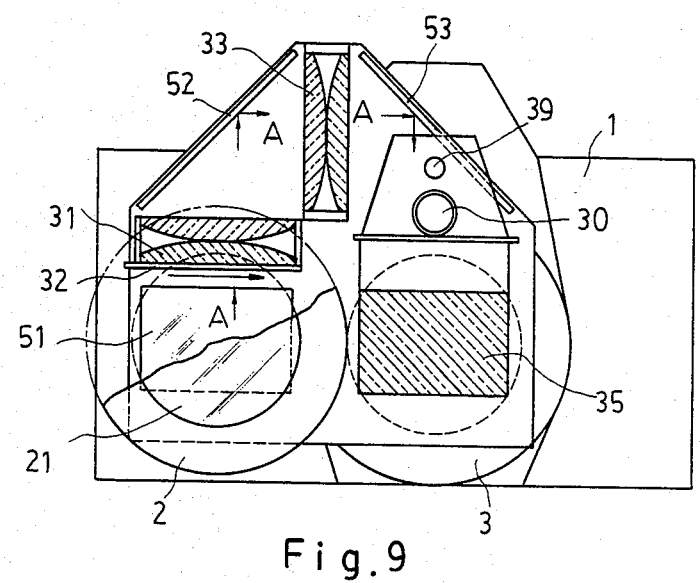
FIG. 9 is the front view of the first preferred embodiment.
Figure 10:
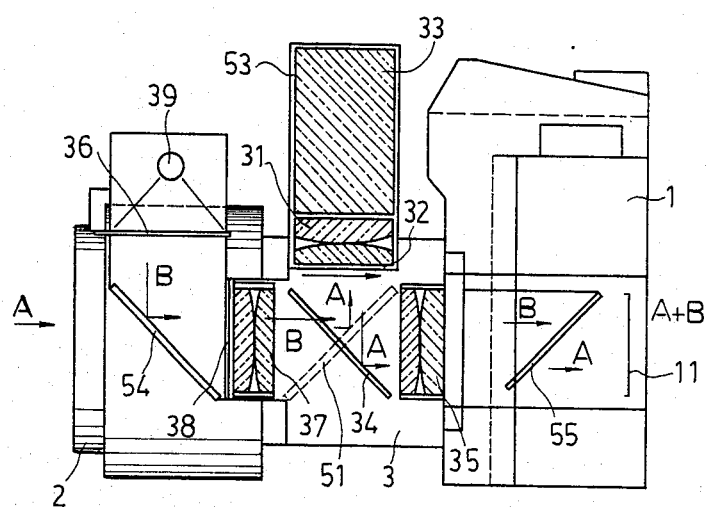
FIG. 10 is a side view of the first preferred embodiment.

Referring to FIG. 1, there is shown the basic structure of camera in the present invention, in which the camera body (1) is the same as that of the conventional camera having (not shown in FIG. 1) shutter, viewfinder, the film loading means and winding means, etc. The camera lens (1) can consist of single piece lens or multiple pieces of lens. The slide projecting device (3) is installed between the camera body (1) and the lens (2); in other words, the camera of the present invention comprises the aforesaid three major components (1), (2) and (3). The slide projecting device (3) can be detachable component to the camera body (1), and the lens (2) can also be a detachable component to both the slide projecting device (3) and the camera body (1).

Referring to FIGS. 2 to 4, there are shown the basic preferred embodiments of the slide projecting device (3), the camera body (1), the camera lens (2), and the optical relationship therein, as well as the principal configuration of the lens set.

Referring to FIG. 2, there is shown the slide projecting device (3), which comprises a field lens (31) mounted on the focal plane of the camera lens (2) or the lens set (21), a mask (32) located in front of the field lens (31), a transferring lens (33) installed behind the field lens for converting the incoming outside image light beam captured on said field lens to outgoing parallel light, a partial reflecting mirror (34) for transmitting the parallel light beam backward, a convergent lens (35) for converging the image rays from said reflecting mirror (34) into an image on the film (11) which is also positioned on the focal plane of said converging lens, a slide projecting lens (37) being used for projecting the slide (36) image on the rear side of said partial reflecting mirror (34), a color temperature conversion filter (38) placed in front of slide projecting lens (37), and a battery lamp (39) for illuminating the slide (36). The field lens (31) is positioned on the focal plane of the camera lens set (21), and is also positioned on the focal plane of the transferring lens (33); the partial reflecting mirror (34) is mounted at an angle of 45° to the incoming rays, either from field lens or from slide projecting lens. With the camera based on aforesaid structure, camera lens (2) captures the outside scenery picture through its lens set (21) and to form an image on the focal plane of said lens (2). The field lens (31) and the mask (32) are all positioned on said focal plane, the light beam of the outside scenery image (A), upon passing through the transparent portion of the mask (32), will form a clear picture image on the field lens (31). The field lens (31) is to reduce the image light beam from scattering outward and to maintain light intensity of picture image for transmitting to the transferring lens (33). Since the field lens (31) is also positioned on the focal plane of the transferring lens (33), the light beam of outside image (A) after passing through transferring lens becomes parallel light beam and continues to pass through partial reflecting mirror (34), then projecting on the convergent lens (35) which converges the incoming parallel light beam and to form an output image again on its focal plane, which is also the position of film (11).

Referring to FIG. 5, there is shown a mask (32) which is made of transparent plastic sheet or a thin glass sheet. The black contour portion (32a) is opaque and is corresponding to the subject portrait on the slide, while the rest area (32b) is transparent. The light ray of outside scenery picture (A) passes through camera lens (2), mask transparent portion (32b), field lens (31), reaches the transferring lens (33), then, becomes parallel light beam, and passes through partial reflecting mirror (34), then projecting on converging lens (35) which focuses and forms into image again on the film (11). As the opaque area (32a) allows no light to pass through, there is no outside image forming in this area on the equivalent portion of the film (11).

Referring to FIG. 6, there is shown the slide transparency (36), the subject portrait portion (36b) which is corresponding to the opaque area (32a) on the mask (32), allows light to pass through while the rest area (36a) of the slide is opaque.

Slide (36) is located on the focal plane of the slide projecting lens (37). When battery lamp (39) is turned on, the subject portrait portion (36b) on the slide (36) receives light ray and passes the subject portrait image through filter (38) and projecting lens (37), and becomes parallel light beam projecting on the rear side of the partial reflecting mirror (34) which reflects the parallel light beam to the convergent lens (35), which then converts the parallel light beam into the subject portrait image again and focuses said subject image on the film (11) on the area equivalent to that of opaque area from mask (32a). Thus, through aforesaid process, a combined image on the film (11) which consisting of the slide subject image (36b) and outside scenery picture image coming through the mask transparent area (32b) can be produced.

As the outside scenery image light ray (A) passes through a number of optical components (e.g. mask, lens, partial reflecting mirror, etc.) before reaching film (11), the light intensity will decrease during the transmission. In order to reduce the loss of light intensity so that adequate amount of light can project on the film, the partial reflecting mirror (34) should be properly coated to make it allow more light from outside scenery image to pass through, and to reduce the reflecting loss of light rays.

The filter (38) in front of the projecting lens (37) is to adjust the color temperature of the battery lamp (39) to the level of conventional sun light film (11) color temperature to make the tone of color of the slide subject image look approximately same as that of outside scenery inage when the combined images are formed on the film (11).

Referring to FIG. 3, there is shown the second preferred embodiment of the present invention, in which the partial reflecting mirror (34) is installed between the field lens (31) and the transferring lens (33), and in which the slide is mounted between the partial reflecting mirror (34) and the slide projecting lens (37); the other structure is similar to the first preferred embodiment. In said second preferred embodiment, the light path distance from field lens (31) via partial reflecting mirror (34) to transferring lens (33) is equal to the focal length of transferring lens. The light path distance from slide (36) via partial reflecting mirror (34) to transferring lens (33) is also equal to the focal length of the transferring lens.

The outside scenery picture image light ray which captured from camera lens set (21), passing through mask (32), forms image on field lens (31). From said field lens, the image (A) transmits to partial reflecting mirror (34). After passing through said mirror, the scenery image light ray (A) combines with the slide subject image light ray (B) which is reflecting on the rear side of the partial reflecting mirror (34); then, the combined light ray projecting toward transferring lens (33) which transforms the combined light ray into parallel light beam, and passes through converging lens (35) which forms the combined image (A+B) on film (11).

Referring to FIG. 4, there is shown the third preferred embodiment of the present invention. The basic structure is similar to the second preferred embodiment, except the following differences: the light path distance from field lens (31) via partial reflecting mirror (34) to transferring lens (33) is equal to the light path distance from transferring lens (33) to film (11), and each is equal to twice the focal length of transferring lens (33). Thus, the outside scenery image (A) forming on field lens (31) will be transferred to film (11) at 1:1 ratio.

The light path distance from slide (36) via partial reflecting mirror (34) to transferring lens (33) is equal to that from field lens (31) to transferring lens (33), therefore, the slide subject image (B) light rays will superimpose the outside scenery image (A) and forming a combined image (A+B) on film (11). No converging lens is needed in the third embodiment.

Referring to FIGS. 7 to 10, there are shown the preferred embodiments which are constructed according to the first embodiment shown in FIG. 2. In order to facilitate the description, some of non-essential portions have been omitted from the drawings. In the said embodiment, the slide projecting device (3) is adapted for installing in the single lens reflex (SLR) camera, the slide projecting device (3) is detachably mounted to the lens mounting aperture of the camera body (1), and the camera lens (2) can also be detachably mounted to slide projecting device (3).

In order to make the overall size of the camera small and compact to facilitate carrying and using, and also to make the image look upright from the viewfinder, a number of reflecting mirrors (51,52,53,54) have been installed in the slide projecting device (3). However, the aforementioned basic optical principle still applies.

The outside scenery picture (A) captured by camera lens set (21), reaches the first reflecting mirror (51) and is reflected to the transparent portion (32b) of the mask (32), and forms the scenery image on the field lens (31). The scenery image light rays then transmit to the second reflecting mirror (52) and are reflected again toward the transferring lens (33). Said transferring lens (33) transforms the image light rays into parallel light beam and projects to reflecting mirror (53) which reflects the parallel light beam toward the partial reflecting mirror (34). Said partial reflecting mirror reflects the parallel light beam toward converging lens (35) which then transforms the parallel light beam into scenery image again on its focal plane where is also the position of film (11).

Reflecting mirror (55) is embedded in the conventional SLR camera for reflecting the scenery image on the viewfinder. Battery lamp (39) projects light rays on slide (36) where the subject image (36b) is transparent. Then the image light beam transmits to mirror (54) which reflects the image light beam toward filter (38) and passes through lens (37) which converts the incoming image light beam into outgoing parallel light beam. Said parallel light beam passes through partial reflecting mirror (34) and combines with aforesaid outside scenery light beam (A) and project together toward converging lens (35) which then forms a combined image (A+B) on film (11).

The aforesaid reflecting mirrors (51, 52,53, 54) and the partial reflecting mirror (34) are all mounted at a 45° angle to the transmitting direction of the images light beam (A) or (B) for the purpose of producing a normal upright image on the viewfinder, and also making the whole camera compact and small to facilitate carrying and using.

Figure 11:
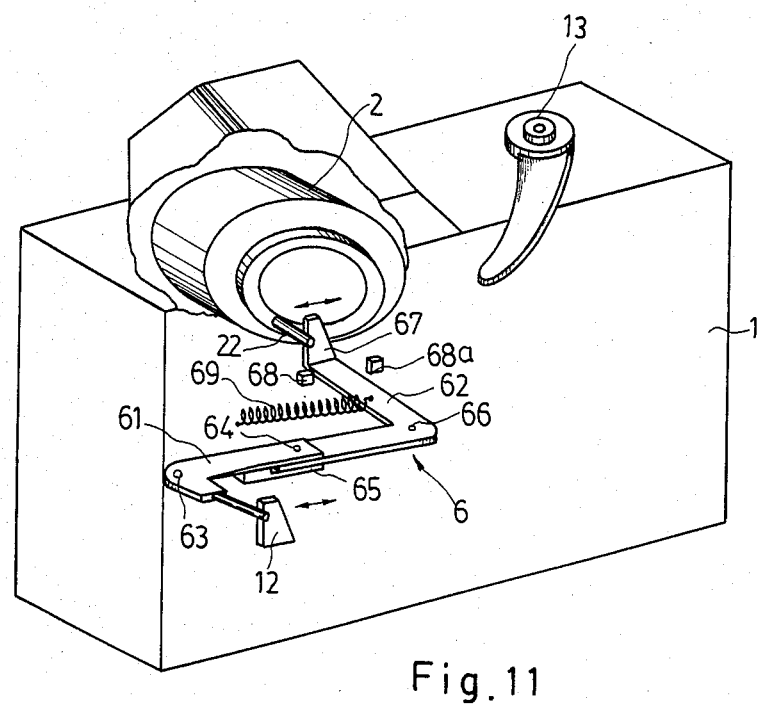
FIG. 11 is a preferred embodiment of the coupling mechanism between the camera body and camera lens for control of the shutter in the present invention.

The slide adjusting knob (30) is for adjusting the position of the slide (36) to make the transparent portion of subject portrait (36b) and the opaque portion (32a) on mask (32) are matched exactly on the film. The filter (38) is to convert the color temperature of the battery lamp (39) to the level of the sun-light type film (11) to make the tone of color of slide subject image look like outside scenery image, to make the final picture look more natural. With the installation of slide projecting device (3) between camera body (1) and lens (2), the center line of the lens (2) and the camera body (1) may not be on the same axis, the coupling mechanism for control of the shutter is needed. Referring to FIG. 11, there is shown a preferred embodiment of said coupling mechanism (6), which comprises two linkage bars (61) and (62). One end of the linkage bar (61) presses against the shutter trigger stud (12) of camera body (1), and said bar (61) can swing back and forth on pivot (63); the other end of said bar (61) is furnished with a pin (64), which is inserted in the fork-like slot (65) at one end of the second linkage bar (62). The linkage bar (62) can swing on pivot (66); the other end of said linkage bar (62) serves as aperture triggering stud (67) which presses against the aperture control pin (22) of the lens (2). The stop studs (68) and (68a) are used for limiting the swinging angle of the linkage bar (62). The tension spring (69) is to keep the triggering stud (67) in constant contact position with the aperture control pin (22). During operation, when the shutter release pin (13) is pressed, the shutter trigger stud (12) moves left and right, linkage bars (61) and (62) swing simultaneously, the aperture control pin (22) is also moved left and right at the same time. Therefore, functionally, this coupling mechanism will produce the same shuttering effect as if the lens (2) were directly mounted on the camera body (1).

In the said embodiment, the light rays of outside scenery image (A) passes through a number of lens and partial reflecting mirror before focusing on film (11). The light intensity of the image will decrease during this transmission. In order to let the film have adequate exposure of light, the opening of diaphragm and the shutter speed should be adjusted to compensate the image light decreasing. Furthermore, the partial reflecting mirror (34) can also be coated to make its reflecting index greater than transparent index, so that more light rays from outside scenery image (A) can be filtered and projected on the film (11). The transparent index can be made lower, because if affects only the slide subject image (36b) transmission which can be controlled by battery lamp (39). The power and light intensity of said lamp has more choices and can be controlled more easily.

Figure 12:
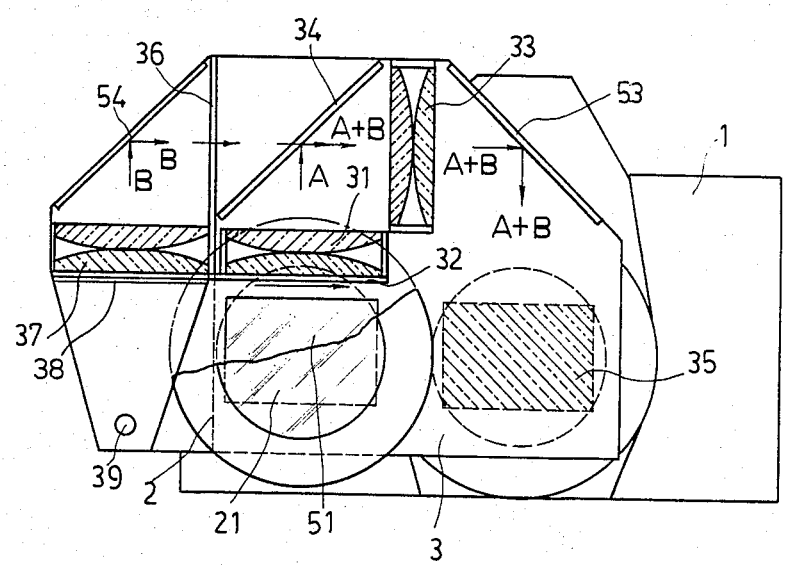
FIG. 12 is a front view of the second preferred embodiment of the camera in the present invention.
Figure 13:
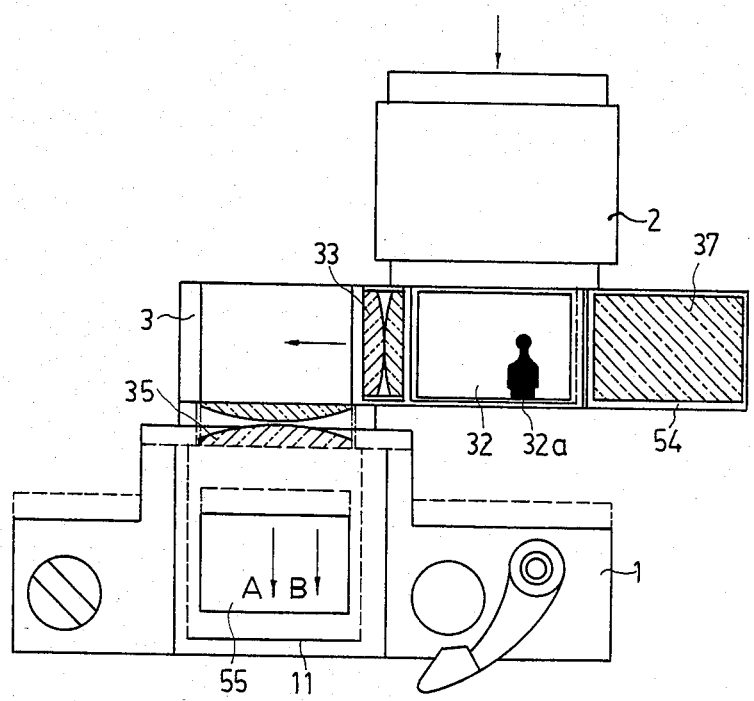
FIG. 13 is a plan view of the second preferred embodiment.
Figure 14:
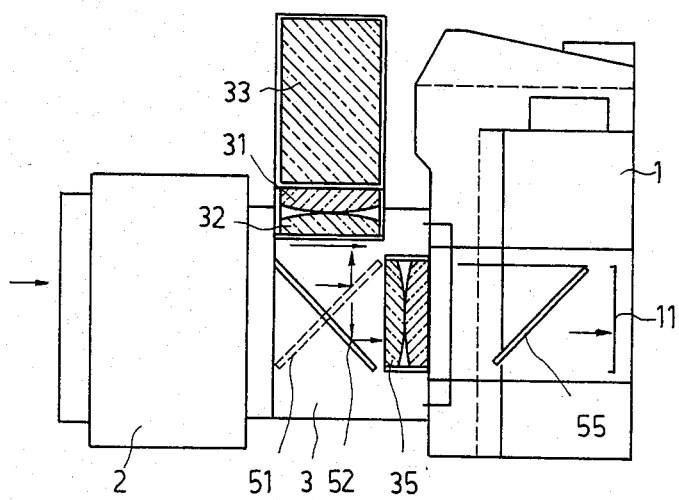
FIG. 14 is a side view of the second preferred embodiment.
Figure 15:
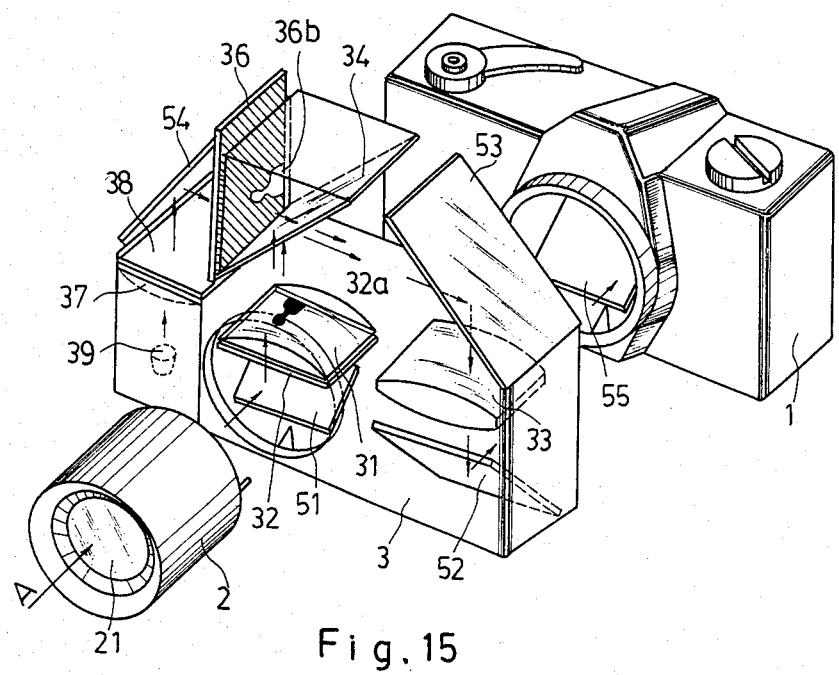
FIG. 15 is a perspective view of the third preferred embodiment of camera in the present invention.
Figure 16:
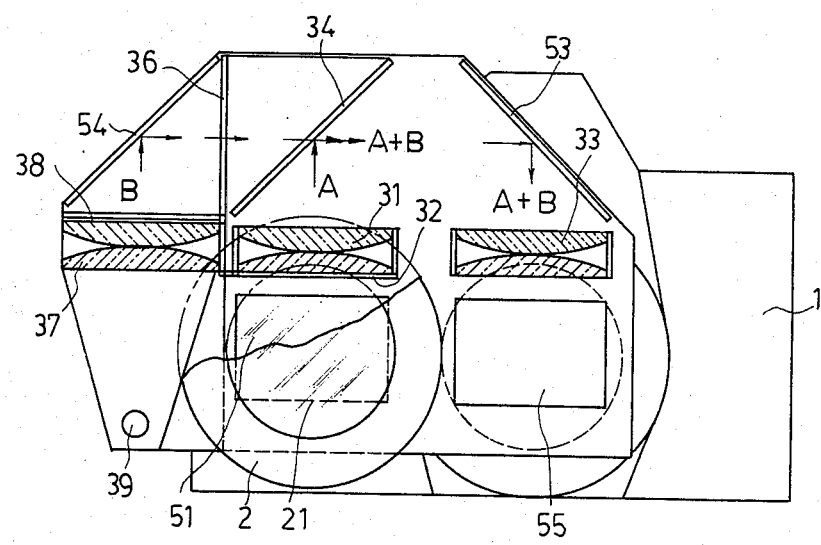
FIG. 16 is a front view of the third preferred embodiment.
Figure 17:
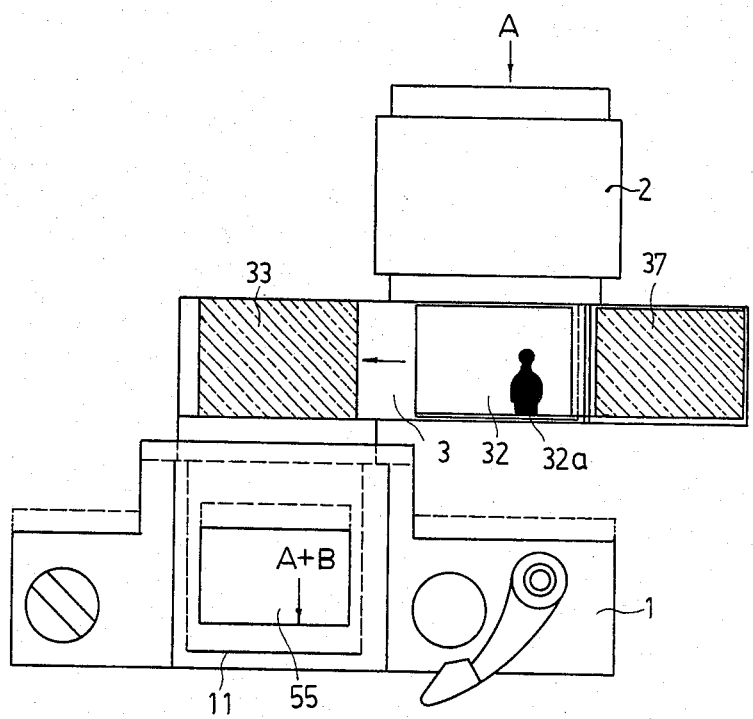
FIG. 17 is a plan view of the third preferred embodiment.
Figure 18:
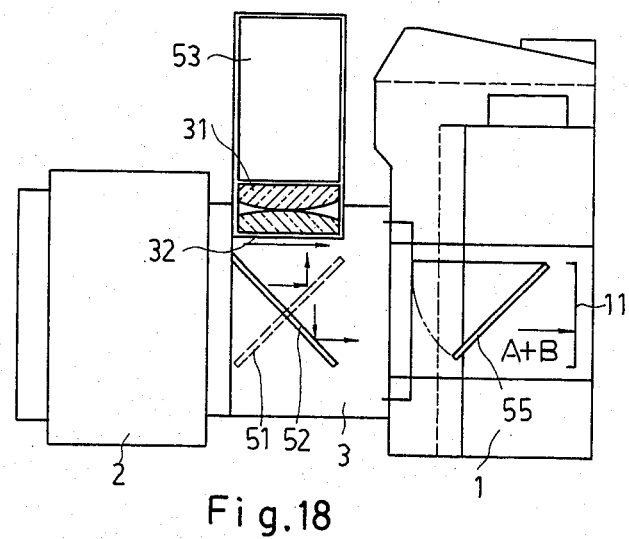
FIG. 18 is a side view of the third preferred embodiment.

Referring to FIGS. 12 to 14, there are shown the second preferred embodiment according to the basic structure shown in FIG. 3; this embodiment has the similar structure as the first preferred embodiment except for the configuration of the slide projecting device (3) and the partial reflecting mirror (34). Battery lamp (39) is at the focal point of projecting lens (37), therefore provides a parallel light beam after passing through said lens (37) and the color temperature conversion filter (38). Said parallel light beam reflects on the reflecting mirror (54), then projecting on the slide (36); wherefrom, the subject image (B) of slide (36) will pass through partial reflecting mirror (34) and superimpose with the outside scenery image (A) to form a combined image light beam projecting on the transferring lens (33), where from the image beam is converted into a parallel beam to be reflected by the reflecting mirrors (53) and (52), and then is converted by the convergent lens (35) to form the final and combined image on the film (11).

Referring to FIGS. 15 to 18, there are shown the third preferred embodiment according to the basic structure as shown in FIG. 4. The light beam of the outside scenery image (A) passes through the mask (32), and forms an image on the field lens (31), where from the image light rays transmit to the partial reflecting mirror (34), reflect toward the reflecting mirror (53), the transferring lens (33), and the reflecting mirror (52); finally, form an image on the film (11). When the light transmitting distance between the field lens (31) and the transferring lens (33) being equal to that between the transferring lens (33) and the film (11); and when that transmitting distance is twice the focal length of lens (33), the image size on film (11) will be equal to that on the field lens (31). Therefore, the external image (A) captured from camera lens set (21) which focus on field lens (31) will be transferred to film (11) on 1:1 ratio.

The slide projecting device (3) of said embodiment is similar to the second preferred embodiment. The light transmitting distance between the slide (36) and the transferring lens (33) should be equal to that between the field lens (31) and the transferring lens (33). By means of said configuration, the subject image (B) of slide and the outside scenery image (A) will be superimposed together to form a combined image on the film (11).

In the aforesaid descriptions of the preferred embodiments shown in FIGS. 7 to 18, a number of reflecting mirrors have been installed between lenses, the purpose of such arrangement is to make the slide projecting device (3) become compact in size to facilitate carrying and using. Another purpose is to make the final image look upright on the camera viewfinder.

Eventually, the basic principle and structure of FIGS. 2 to 4 apply to all said preferred embodiments.

With the function and characteristics of this invention, a person can insert his own slide portrait and the mask into the camera, and to take his own picture against any desired landscape background. Both the portrait and landscape background can be sharp focus and clear, whether the depth of field of the background is short or long, as the person does not need to stand in front of the camera lens.

Upon the slide projecting device being detached from the camera, the lens can be detached from the slide projecting device and mounted back to the camera body again. The camera will become a conventional single lens camera.

I claim:

1. A multi-image camera comprising a camera body, a camera lens set, and an attachable image transfer cartridge being attached between said camera body and said camera lens set, said image transfer cartridge comprising a field lens, a mask, an image transfer lens, a partial reflecting mirror, a slide transparency, an image converging lens, and a slide projecting lens, whereby an external picture image passes through said camera lens set, mask, field lens and projects onto said partial reflecting mirror, and upon said partial reflecting mirror said slide transparency also has its subject image projected thereon, both said external picture image and said slide transparency image merge and form a combined image after leaving said partial reflecting mirror and projecting onto said image converging lens which focuses and projects said combined image on a negative film contained in said camera body, wherein said image transfer cartridge includes said mask positioned on the focal plane of said camera lens set, said field lens positioned behind said mask, said image transfer lens to convert the image light rays from the field lens into a parallel light beam, said partial reflecting mirror to receive and transmit the light beam coming from the image transfer lens and also to receive said light beam from said slide projecting lens, said slide projecting lens for projecting the slide image light beam on the backside of said partial reflecting mirror, said slide installed in front of said projecting lens, and a filter installed in front of said projecting lens, a lamp to illuminate the slide, and said convergent lens installed behind the partial reflecting mirror for superimposing the outside scenery image light rays entering through said camera lens set, the mask, the field lens, the transferring lens, the partial reflecting mirror and the subject image light rays of said slide coming through said slide projecting lens, the back of the partial reflecting mirror so as to form a combined image on the film, which is on the focal plane of said convergent lens.

2. A camera according to claim 1, wherein said field lens is mounted between the camera lens set and the image transfer lens, and at the position of the focal plane of camera lens set and also on the focal plane of said image transfer lens.

3. A camera according to claim 1, wherein said slide is positioned on the focal plane of said slide projecting lens.

* * * * *